United States Patent
Strickroth

(10) Patent No.: US 10,478,776 B2
(45) Date of Patent: Nov. 19, 2019

(54) PROCESS FOR THE REMOVAL OF HEAVY METALS FROM FLUIDS

(71) Applicant: CPPE CARBON PROCESS & PLANT ENGINEERING S.A., Luxembourg-Dommeldange (LU)

(72) Inventor: Alain Strickroth, Belvaux (LU)

(73) Assignee: CPPE CARBON PROCESS & PLANT ENGINEERING S.A., Luxembourg-Dommeldange (LU)

( * ) Notice: Subject to any disclaimer, the term of this patent is extended or adjusted under 35 U.S.C. 154(b) by 0 days.

(21) Appl. No.: 16/091,099

(22) PCT Filed: Mar. 23, 2017

(86) PCT No.: PCT/EP2017/056902
§ 371 (c)(1),
(2) Date: Oct. 3, 2018

(87) PCT Pub. No.: WO2017/174365
PCT Pub. Date: Oct. 12, 2017

(65) Prior Publication Data
US 2019/0118138 A1   Apr. 25, 2019

(30) Foreign Application Priority Data

Apr. 4, 2016  (LU) ......................................... 93013

(51) Int. Cl.
| | | |
|---|---|---|
| *B01D 53/82* | (2006.01) | |
| *B01D 53/64* | (2006.01) | |
| *B01D 53/72* | (2006.01) | |
| *C02F 1/28* | (2006.01) | |
| *B01J 20/20* | (2006.01) | |
| *C02F 101/20* | (2006.01) | |
| *C02F 101/10* | (2006.01) | |
| *C02F 101/36* | (2006.01) | |

(52) U.S. Cl.
CPC ............. *B01D 53/82* (2013.01); *B01D 53/64* (2013.01); *B01D 53/72* (2013.01); *B01J 20/20* (2013.01); *C02F 1/288* (2013.01); *B01D 2255/20738* (2013.01); *B01D 2255/702* (2013.01); *B01D 2257/602* (2013.01); *B01D 2257/7027* (2013.01); *C02F 1/281* (2013.01); *C02F 1/283* (2013.01); *C02F 2101/103* (2013.01); *C02F 2101/20* (2013.01); *C02F 2101/366* (2013.01)

(58) Field of Classification Search
None
See application file for complete search history.

(56) References Cited

U.S. PATENT DOCUMENTS

| | | | |
|---|---|---|---|
| 4,710,364 A | 12/1987 | Berry | |
| 4,735,785 A * | 4/1988 | Eichholtz | B01D 53/8625 |
| | | | 423/235 |
| 4,911,825 A | 3/1990 | Roussel et al. | |
| 5,122,358 A | 6/1992 | Lailach et al. | |
| 5,965,095 A * | 10/1999 | Owens | B01D 53/64 |
| | | | 423/210 |
| 6,136,749 A * | 10/2000 | Gadkaree | B01D 53/8665 |
| | | | 502/180 |
| 6,149,886 A | 11/2000 | Schoubye | |
| 7,387,981 B1 | 6/2008 | Kaminsky et al. | |
| 7,722,843 B1 * | 5/2010 | Srinivasachar | B01D 53/502 |
| | | | 252/182.11 |
| 8,628,603 B2 | 1/2014 | Martin et al. | |
| 10,016,723 B2 | 7/2018 | Strickroth | |
| 2001/0038814 A1 | 11/2001 | Fischer et al. | |
| 2003/0157010 A1 | 8/2003 | Anastasijevic | |
| 2006/0229476 A1 | 10/2006 | Mitchell, Sr. et al. | |
| 2007/0007201 A1 | 1/2007 | Lupton | |
| 2008/0207443 A1 * | 8/2008 | Gadkaree | B01D 53/02 |
| | | | 502/417 |
| 2009/0111690 A1 * | 4/2009 | Gadkarec | B01J 20/0266 |
| | | | 502/417 |
| 2010/0000408 A1 | 1/2010 | Haruma et al. | |
| 2010/0239479 A1 | 9/2010 | Gadkaree et al. | |
| 2010/0294130 A1 | 11/2010 | Haruna et al. | |

(Continued)

FOREIGN PATENT DOCUMENTS

| | | |
|---|---|---|
| CN | 1032772 A | 5/1989 |
| CN | 101573291 A | 11/2009 |

(Continued)

OTHER PUBLICATIONS

Fell, "Removal of dioxins and furans from flue gases by non-flammable adsorbents in a fixed bed," Chemosphere, vol. 37 Nos. 9-12, pp. 2327-2334, 1998 (Year: 1998).*
International Preliminary Report on Patentability dated Jul. 19, 2018 re: Application No. PCT/EP2017/058008, pp. 1-15, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1, WO 2016/042005 A1 and U.S. Pat. No. 7,387,981 B1.
International Search Report dated Jun. 21, 2017 re: Application No. PCT/EP2017/058008, pp. 1-5, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1, WO 2016/042005 A1 and U.S. Pat. No. 7,387,981 B1.

(Continued)

*Primary Examiner* — Chester T Barry
(74) *Attorney, Agent, or Firm* — Cantor Colburn LLP

(57) ABSTRACT

A process for removal of heavy metals and/or dioxins from a fluid including heavy metals, where the fluid is brought in contact with a mixture including between 30% vol. and 60% vol. of an activated carbon catalyst impregnated with sulfur, between 30% vol. and 60% vol. of an activated carbon catalyst impregnated with iron and between 5% vol. and 40% vol. of a filler material, the total of these three ingredients being 100% vol, where the fluid is left in contact with the mixture, the heavy metals and/or dioxins are absorbed onto the mixture to obtain a fluid with a depleted level of heavy metals, which fluid is then evacuated from the mixture.

15 Claims, No Drawings

(56) References Cited

U.S. PATENT DOCUMENTS

| | | | |
|---|---|---|---|
| 2011/0223082 A1* | 9/2011 | Chang | B01D 53/025 423/210 |
| 2013/0108533 A1 | 5/2013 | Strickroth | |
| 2013/0108858 A1* | 5/2013 | Biteau | C03C 1/008 428/304.4 |
| 2013/0202504 A1* | 8/2013 | Pollack | B01D 53/02 423/210 |
| 2013/0206408 A1* | 8/2013 | Chatterjee | C04B 33/1352 166/280.1 |
| 2013/0269521 A1 | 10/2013 | Nishita et al. | |
| 2014/0314647 A1 | 10/2014 | Strickroth | |
| 2016/0353743 A1* | 12/2016 | Mills | A01N 25/08 |
| 2017/0087502 A1 | 3/2017 | Jameson et al. | |
| 2019/0126200 A1 | 5/2019 | Strickroth | |

FOREIGN PATENT DOCUMENTS

| | | |
|---|---|---|
| EP | 030224 A2 | 2/1989 |
| EP | 1459799 A1 | 9/2004 |
| EP | 1726565 A1 | 11/2006 |
| EP | 2260940 A1 | 12/2010 |
| JP | H11236207 A | 8/1999 |
| JP | 2000296310 A | 10/2000 |
| JP | 2002282624 A | 10/2002 |
| JP | 2004081969 A | 3/2004 |
| JP | 3562551 B2 | 9/2004 |
| JP | 2006035042 A | 2/2006 |
| WO | 2008143831 A2 | 11/2008 |
| WO | 2015078953 A1 | 6/2015 |
| WO | 2016042005 A1 | 3/2016 |

OTHER PUBLICATIONS

Written Opinion dated Jun. 21, 2017 re: Application No. PCT/EP2017/058008, pp. 1-5, citing: US 2001/038814 A1, US 2006/229476 A1, US 2014/314647 A1, US 2010/000408 A1, US 2010/294130 A1, EP 1 459 799 A1, US 2013/269521 A1, EP 1 726 565 A1, US 2013/108533, A1 2007/007201 A1 and WO 2016/042005 A1.

International Preliminary Report on Patentability re: Application No. PCT/EP2017/057789, dated Apr. 3, 2018, pp. 1-36.

International Search Report dated Jun. 12, 2017 re: Application No. PCT/EP2017/057789, pp. 1-4, citing: EP 0 02 224 A2, EP 2 260 940 A1, JP H11 236207 A, JP 3 562551 B2.

Written Opinion dated Jun. 12, 2017 re: Application No. PCT/EP2017/057789, pp. 1-6, citing: EP 0 02 224 A2, EP 2 260 940 A1, JP H11 236207 A, JP 3 562551 B2.

H. J. Fell et al. "Removal of Dioxins and Furans From Flue Gases by Non-Flammable Adsorbents in a Fixed Bed", Chemosphere, 1998, vol. 37, Nos. 9-12, pp. 2327-2334, XP002769699.

International Search Report dated May 12, 2017 re: Application No. PCT/EP2017/056902, pp. 1-4, citing: Fell et al. "Removal of Dioxins . . .", U.S. Pat. No. 7,722,843 B1, US 2008/207443 A1, US 2010/239479 A1, US 2009/111690 A1 and U.S. Pat. No. 4,911,825 A.

Written Opinion dated May 12, 2017 re: Application No. PCT/EP2017/056902, pp. 1-5, citing: Fell et al. "Removal of Dioxins . . . " and U.S. Pat. No. 7,722,843 B1.

CN Office Action dated Feb. 28, 2019 re: Application No. 201780027960.9, pp. 1-12, citing: WO2016/042005A1, CN101573291A, CN1032772A, U.S. Pat. No. 6,149,886A and US2003/157010A1.

JP Office Acton dated Feb. 12, 2019 re: Application No. P2018-563463, pp. 1-7, citing: JP P2006-35042A, JP 2004-81969A, JP P2002-282624A, JP P2000-296310A and WO2015/078953A1

Japanese Office Action for the corresponding Japanese Application No. P2018-563461; dated Feb. 12, 2019; 6 pages.

* cited by examiner

PROCESS FOR THE REMOVAL OF HEAVY METALS FROM FLUIDS

TECHNICAL FIELD

The present disclosure generally relates to the removal of heavy metals from fluids and relates in particular to a process for the removal of heavy metals from liquids and/or gas in a fixed bed reactor.

BACKGROUND ART

Activated carbon catalysts are widely used for different applications including heavy metal removals from gas and liquids. It has been found however that the performance of the activated carbon catalysts could still be enhanced.

U.S. Pat. No. 7,722,843 discloses a process for the removal of mercury from a combustion exhaust gas stream in a combustion exhaust gas purification scheme that includes a combustion exhaust scrubber system that uses an aqueous liquid to remove acid gases from the combustion exhaust gas. The process comprises providing a powdered mercury sorbent, introducing the powdered mercury sorbent into the aqueous liquid in the scrubber system, and after introduction of the mercury sorbent into the aqueous liquid, separating at least some of the mercury sorbent from the aqueous liquid.

The so-called Kombisorbon® process (Chemosphere Vol. 37 Nos 9-12, pp2327-2334, 1998 Elsevier Science Ltd) is a fixed bed process designed for the removal of heavy metals, in particular mercury and cadmium, dioxins and furans, other ecotoxic organic components from waste gases.

Typical raw gas conditions:

| Gas temperature | up to 90° C. |
|---|---|
| Dust | 2-10 mg/dscm (dry standard cubic meter) |
| Mercury | up to 10 mg/dscm |
| Dioxin/Furan (TE) | up to 300 ng/dscm |

Clean gas criteria (new MACT emission standards for new FBIs (USEPA 2011, Federal Register: 40CFR Part 60): at 7% O2):

| Mercury | <1 µg/dscm |
|---|---|
| Dioxin/Furan (TE) | <0.004 ng/dscm |

The Kombisorbon® system generally uses a conditioner and a fixed-bed adsorber. The conditioner includes a coalescer, a droplet separator and a heat exchanger to condition the flue gas to reach optimal parameters before entering the adsorber.

The Kombisorbon® process offers the following key advantages:

Removal of ionic mercury known as $Hg^{2+}$ through adsorption as $HgCl_2$ on the activated carbon Elemental mercury known as $Hg^0$ by forming with the sulfur on the carbon mercuric sulfide known as HgS Removal of dioxins and furans through absorption.

Typical applications are sewage sludge or hazardous waste incineration plants. The first commercial-scale Kombisorbon® unit was installed in a sewage sludge incineration plant in 1994. Since that time more than 20 units have been put into operation worldwide.

BRIEF SUMMARY

The disclosure provides an activated carbon catalyst composition having an improved activity as well as a more efficient process for the removal of heavy metals from a fluid.

In one embodiment, the disclosure provides a process for the removal of heavy metals from a fluid comprising heavy metals, wherein the fluid is brought in contact with a mixture comprising between 30% vol. and 60% vol. of an activated carbon catalyst impregnated with sulfur, between 30% vol. and 60% vol. of an activated carbon catalyst impregnated with iron and between 5% vol. and 40% vol. of a filler material, the total of these three ingredients being 100% vol., leaving the fluid in contact with the mixture, absorption of the heavy metals onto the mixture to obtain a fluid with a depleted level of heavy metals, evacuation of the fluid with a depleted level of heavy metals from the mixture.

Surprisingly it has been found that the process for removal of heavy metals from a fluid is more efficient if a mixture of an activated carbon catalyst impregnated with sulfur and of an activated carbon catalyst impregnated with iron and of a filler material is used. It has also been found that the catalyst activity is more easily regenerated if between 5 and 40% vol. of a filler material is used. As a demonstration example of this, a Kombisorbon® unit is regenerated periodically (2-4 times a year) on an industrial site. The drying time period after this regeneration period is reduced by more than 40% (28 instead of 48 hours) in case of a reactor bed with an activated carbon (80%)/filler material (20%) mixture compared to activated carbon alone.

The term heavy metal refers to any metallic chemical element that has a relatively high density and is toxic or poisonous at low concentrations. Examples of heavy metals include mercury (Hg), cadmium (Cd), arsenic (As), chromium (Cr), thallium (TI), and lead (Pb). A toxic heavy metal is any relatively dense metal or metalloid that is noted for its potential toxicity, especially in environmental contexts. The term has particular application to cadmium, mercury, lead and arsenic, all of which appear in the World Health Organisation's list of 10 chemicals of major public concern. Other examples include manganese (Mg), cobalt (Co), nickel (Ni), copper (Cu), zinc (Zn), selenium (Se), silver (Ag) and antimony (Sb).

Surprisingly it has been found that the process can be used for the removal of heavy metals from a gas—i.e. waste gas from incineration plant eliminating municipal solid waste, industrial solid wastes and sewage sludge or liquids from industrial waste water, from cement industry, from petroleum refining, from chemical manufacturing, from metal finishing, from printed circuit manufacturing, from oil and gas extraction and from hazardous waste.

According to various embodiments, the mixture comprises at least 30% vol., 31% vol., 32% vol., 33% vol., 34% vol., 35% vol., 36% vol., 37% vol., 38% vol., 39% vol., 40% vol., 41% vol., 42% vol., 43% vol., 44% vol., 45% vol., 46% vol., 47% vol., 48% vol., 49% vol., 50% vol., 51% vol., 52% vol., 53% vol., 54% vol., 55% vol., 56% vol., 57% vol., 58% vol. or 59% vol. of an activated carbon catalyst impregnated with sulfur.

According to various embodiments, the mixture comprises at most 60% vol., 59% vol., 58% vol., 57% vol., 56% vol., 55% vol., 54% vol., 53% vol., 52% vol., 51% vol., 50% vol., 49% vol., 48% vol., 47% vol., 46% vol., 45% vol., 44% vol., 43% vol., 42% vol., 41% vol., 40% vol., 39% vol., 38% vol., 37% vol., 36% vol., 35% vol., 34% vol., 33% vol., 32% vol., or 31% vol., of an activated carbon catalyst impregnated with sulfur.

In a preferred embodiment, the mixture comprises between 40% vol. and 50% vol. of activated carbon catalyst impregnated with sulfur.

Preferably, the activated carbon catalyst impregnated with sulfur comprises between 5% weight and 20% weight of sulfur.

According to various embodiments, the mixture comprises at least 30% vol., 31% vol., 32% vol., 33% vol., 34% vol., 35% vol., 36% vol., 37% vol., 38% vol., 39% vol., 40% vol., 41% vol., 42% vol., 43% vol., 44% vol., 45% vol., 46% vol., 47% vol., 48% vol., 49% vol., 50% vol., 51% vol., 52% vol., 53% vol., 54% vol., 55% vol., 56% vol., 57% vol., 58% vol. or 59% vol. of an activated carbon catalyst impregnated with iron.

According to various embodiments, the mixture comprises at most 60% vol., 59% vol., 58% vol., 57% vol., 56% vol., 55% vol., 54% vol., 53% vol., 52% vol., 51% vol., 50% vol., 49% vol., 48% vol., 47% vol., 46% vol., 45% vol., 44% vol., 43% vol., 42% vol., 41% vol., 40% vol., 39% vol., 38% vol., 37% vol., 36% vol., 35% vol., 34% vol., 33% vol., 32% vol., or 31% vol. of an activated carbon catalyst impregnated with iron.

In a preferred embodiment, the mixture comprises between 40% vol. and 50% vol. of activated carbon catalyst impregnated with iron.

Preferably, the activated carbon catalyst impregnated with iron comprises between 10% weight and 30% weight of iron.

The activated carbon catalyst is preferably extruded and has a grain size of 0.80-130 mm. The activated carbon catalyst is preferably granulated and has a grain size: 0.30 to 4.75 mm. The activated carbon catalyst is thus not under powder form.

In an embodiment the activated carbon catalyst is preferably a mixture of granulated and extruded catalyst.

The carbon catalyst may be produced from brown and bituminous coals, fruit pits, coconut shells, lignite, peat, wood, sawdust/saw chip, petroleum coke, bone and paper mill waste (lignin), synthetic polymers like PVC, rayon, viscose, polyacrylonitrile or phenols.

The carbon catalyst may be activated by:
- a physical treatment: heat, steam, oxygen, $CO_2$, air
- a chemical treatment: impregnation with acid, strong base or salts (e.g. sulfuric, chlorohydric or phosphoric acid, potassium or sodium hydroxide, calcium or zinc chloride)
- a combination of both a physical and a chemical treatment.

The activated carbon catalyst may have a specific surface area (BET) from 400 to 1800 $m^2/g$ and an acid or alkaline pH.

According to various embodiments, the mixture comprises at least 5% vol., 6% vol., 7% vol., 8% vol., 9% vol., 10% vol., 11% vol., 12% vol., 13% vol., 14% vol., 15% vol., 16% vol., 17% vol., 18% vol., 19% vol., 20% vol., 21% vol., 22% vol., 23% vol., 24% vol., 25% vol., 26% vol., 27% vol., 28% vol., 29% vol., 30% vol., 31% vol., 32% vol., 33% vol., 34% vol., 35% vol., 36% vol., 37% vol., 38% vol. or 39% vol., of filler material.

According to various embodiments, the mixture comprises at most 40% vol., 39% vol., 38% vol., 37% vol., 36% vol., 35% vol., 34% vol., 33% vol., 32% vol., 31% vol., 30% vol., 29% vol., 28% vol., 27% vol., 26% vol., 25% vol., 24% vol., 23% vol., 22% vol., 21% vol., 20% vol., 19% vol., 18% vol., 17% vol., 16% vol., 15% vol., 14% vol., 13% vol., 12% vol., 11% vol., 10% vol., 9% vol., 8% vol., 7% vol. or 6% vol. of filler material.

In a preferred embodiment, the filler materials are present in an amount from 5 to 15% vol.

Preferably, the filler material comprises plastic, metals, alumina, ceramic materials or mixture thereof.

According to various embodiments, the filler material is a shape chosen among saddle shaped, ring shaped, ball shaped, torus shaped, prism shaped or irregular shaped.

In particular, filler materials made of ceramic material, having a free volume of 50-79% may be used:
i. Novalox® Saddle: 12.7-76.2 mm
ii. Berl saddle: 4-50 mm
iii. Cylindrical ring: 5-200 mm
iv. Pall® ring: 25-100 mm
v. Transitional grid lining
vi. Cylindrical ring with 1 bar or 1 cross: 80-200 mm
vii. Grid block: 215*145*90 mm In particular, filler materials made of metal, having a free volume of 95-98% may be used:
i. Cylindrical ring. 15-50 mm
ii. Pall® ring: 15-90 mm
iii. VSP®: 25-50 mm
iv. Top-Pak®: 15 mm
v. Novalox®-M: 15-70 mm
vi. Twin-Pak®: 10-15 mm
vii. Interpak®: 10-20 mm In particular, filler materials made of plastic, having a free volume of 87-97% may be used:
i. Novalox® saddle: 12.7-50.8 mm
ii. Pall® ring: 15-90 mm
iii. VSP®: 25-90 mm
iv. Igel®: 40 mm
v. Netball®: 45-90 mm The filler material is thus made up of distinct, individual particles that are added to the activated carbon catalyst to improve, to enhance some properties of the mixtured material. The filler material particles generally have a mean particle size (based on the average largest dimension (by number) of the particle) of more than 4 mm. Usually their mean particle size (based on the average largest dimension (by number) of the particle) is less than 200 mm.

In an embodiment, the mixture of activated carbon catalyst impregnated with sulfur, activated carbon catalyst impregnated with iron and a filler material contains no other solid ingredients than the activated carbon catalysts and the filler material. The total of these three ingredients makes thus 100% vol. of the mixture. It goes without saying that the mixture is a heterogeneous mixture since the components have a different particles sizes, different densities etc. The mixture comprises preferably a mixture of separate, distinct particles of filler and separate, distinct particles of activated carbon catalyst. This makes it easy to separate the activated carbon catalyst from the filler when the activated carbon catalyst needs to be replaced.

According to various embodiments, the process can be used where the fluid is a gas, preferably a waste gas from sewage incineration plants, sludge incineration plants or hazardous waste incineration plants.

In a preferred embodiment, the gas comprises at least 50 mg/dscm, preferably at least 45 mg/dscm, more preferably at least 40 mg/dscm of heavy metals.

In a preferred embodiment, the gas comprises at least 1000 ng/dscm, preferably at least 500 ng/dscm, more preferably at least 200 ng/dscm of dioxins. The term "dioxins" as used herein refers to dioxins and dioxin-like substances, including PCBs, as defined in the Stockholm Convention on Persistent Organic Pollutants.

According to various embodiments, the fluid used in the above process can be a liquid.

Preferably, the liquid is left in contact with the catalyst composition for at least 1 h, 2 h, 3 h or 10 h.

According to various embodiments, the liquid comprises at least 50 mg/l of heavy metals, preferably at least 45 mg/l, more preferably at least 40 mg/l of heavy metals.

In a preferred embodiment, the liquid comprises at least 20 µg/l, preferably at least 2 µg/l, more preferably at least 0.02 µg/l of dioxins.

DETAILED DESCRIPTION

Further details and advantages of the present disclosure will be apparent from the following detailed description of several not limiting embodiments.

Test 1—Removal from Gas—Plant Scale

Emission sampling during two days was performed at the outlet of the Kombisorbon® process reactor, filled with a specific activated carbon mixture: 45% of activated carbon impregnated with sulfur supplied from Jacobi Carbons, 45% of activated carbon impregnated with iron supplied from Watch-Water, and 10% of a plastic filler material.

The removal rate of cadmium was 99.9%, for mercury more than 99.9% and more than 99.9% removal rate for dioxins. The initial levels were 5 mg/dscm for cadmium, 1 mg/dscm for mercury and 350 ng/dscm for dioxins.

The presence of activated carbon mixture and filler material allowed a better gas flow distribution and subsequently the cleaning of a higher concentrated inlet gas due to an increased removal rate of contaminants.

The presence of filler allowed a more efficient washing of the activated carbon with sulfates removal coming from the reaction between SOx and NOx with water vapors from inlet flue gas.

The presence of filler allowed a quicker drying step after regeneration with water flow.

Test 1-b Comparative Example—Removal from Gas—Plant Scale

Emission sampling during two days was performed at the outlet of the Kombisorbon® process reactor, filled with a 100% of activated carbon impregnated with sulfur supplied from Jacobi Carbons.

The removal rate of cadmium was 99%, for Mercury, more than 99% and more than 99% removal rate for dioxins. The initial levels were 5 mg/dscm for cadmium, 1 mg/dscm for mercury and 350 ng/dscm for dioxins.

Test 2—Removal from Liquid—Laboratory Scale—Single Pass 500 cm$^3$ of a mixture: 30% of activated carbon catalyst impregnated with sulfur supplied from Jacobi Carbons, 30% of activated carbon impregnated with iron supplied from Watch-Water, 40% of a plastic filler material was used during this test.

The level of heavy metals in a phosphoric acid solution was reduced significantly. 20% removal rate for cadmium and mercury and 35% removal rate for arsenic.

Test 3—Removal from Liquid—Laboratory Scale—Single Pass 500 cm$^3$ of a mixture of 45% of activated carbon impregnated with sulfur, 45% of activated carbon impregnated with iron supplied from Watch-Water, and 10% of a plastic filler material was used during this test.

The level of heavy metals in a phosphoric acid solution was reduced significantly. 75% removal for cadmium and mercury and 65% removal for arsenic. The initial concentrations were 39 ppm for cadmium, 0.1 ppm for mercury and 23 ppm for arsenic.

The presence of filler material allowed less clogging from silica coming from the phosphoric acid media inside the activated carbon bed.

The presence of filler material allowed a more efficient washing of the activated carbon with easier silica removal.

Test 3-b—Comparative Example—Removal from Liquid—Laboratory Scale—Single Pass 500 cm$^3$ of 100% of activated carbon impregnated with sulfur supplied from Jacobi Carbons was used during this test.

The level of heavy metals in a phosphoric acid solution (As: 23 ppm, Hg: 0.1 ppm and Cd: 39 ppm) was reduced. Only a 20% removal rate for mercury and only 35% removal rate for arsenic were achieved.

Test 3-c—Comparative Example—Removal from Liquid—Laboratory Scale Single Pass 500 cm$^3$ of 100% of activated carbon catalyst impregnated with iron supplied from Watch-Water was used during this test.

The level of heavy metals in a phosphoric acid solution (As: 23 ppm, Hg: 0.1 ppm and Cd: 39 ppm) was reduced. Only a 50% removal rate for cadmium and mercury and only a 15% removal rate for arsenic were achieved.

The activated carbon used in the tests above had a specific high catalytic surface area (BET at least 700 m$^2$/g) with impregnation (like Br, Cu, Fe, S, OH . . . ).

The activated carbon was mixed with various types of filler materials of different shapes (cylinder, balls, "Sattelkörper", . . . ) and different material (plastic, alumina, ceramic, . . . ) in various ratios (1/5; 1/3; 1/10; . . . ). Different suppliers of activated carbon catalysts for companies like Jacobi, Cabot Carbon, Chemviron, Desotec, Carbotech and ATEC were tested.

It must be noted that the active carbon catalysts do not contain:

a. any iodine, bromine or a compound thereof,
b. any water repellent,
c. any catalytically active metals such as Platinum, Palladium, Rhodium etc. or,
d. any organic/catalytically active metal complexes based on metals such as Platinum, Palladium, Rhodium etc.

The active carbon catalyst is not hydrophobized by means of hydrophobic polymer compounds such as polytetrafluoroethylene, polyisobutylene, polyethylene, polypropylene or polytrichlorfluorethylen.

Although the present disclosure has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A process for the removal of heavy metals and/or dioxins from a fluid comprising heavy metals, the process comprising
   bringing the fluid in contact in a fixed-bed adsorber with a mixture comprising, based on a total volume of particles in the mixture,
   between 30% vol. and 60% vol. of separate, distinct particles of an activated carbon catalyst impregnated with sulfur,
   between 30% vol. and 60% vol. of separate, distinct particles of an activated carbon catalyst impregnated with iron, and
   between 5% vol. and 40% vol. of separate, distinct particles of a filler material, said particles of a filler material having a mean particle size, based on the average largest dimension—by number—of the particle, of more than 4 mm,
   leaving the fluid in contact with the mixture,
   allowing absorption of the heavy metals and/or dioxins onto the mixture to obtain a fluid with a depleted level of heavy metals and/or dioxins, and
   evacuating the fluid with a depleted level of heavy metals and/or dioxins from the mixture,
   wherein any individual particle of said activated carbon catalyst impregnated with sulfur is distinguishable from any individual particle of said activated carbon catalyst impregnated with iron at least on the basis of chemical composition.

2. The process as claimed in claim 1, wherein the fluid is a gas.

3. The process as claimed in claim 2, wherein the gas is a waste gas from sewage, sludge or hazardous waste incineration plants.

4. The process as claimed in claim 2, wherein the gas comprises at least 50 mg/dscm % weight of heavy metals and/or at least 200 ng/dscm of dioxins.

5. The process as claimed in claim 1, wherein the fluid is a liquid.

6. The process as claimed in claim 5, wherein the liquid comprises at least 40 mg/l of heavy metals and/or at least 0.02 μg/l of dioxins.

7. The process as claimed in claim 1, wherein the mixture comprises between 40% vol. and 50% vol. of the separate, distinct particles of activated carbon catalyst impregnated with sulfur, based on a total volume of particles in the mixture.

8. The process as claimed in claim 1, wherein the separate, distinct particles of activated carbon catalyst impregnated with sulfur comprises between 5% weight and 20% weight of sulfur, based on a total weight of the separate, distinct particles of activated carbon catalyst impregnated with sulfur.

9. The process as claimed in claim 1, wherein the mixture comprises between 40% vol. and 50% vol. of the separate, distinct particles of activated carbon catalyst impregnated with iron, based on a total volume of particles in the mixture.

10. The process as claimed in claim 1, wherein the separate, distinct particles of activated carbon catalyst impregnated with iron comprises between 10% weight and 30% weight of iron, based on a total weight of the separate, distinct particles of activated carbon catalyst impregnated with iron.

11. The process as claimed in claim 1, wherein the filler material comprises at least one of plastic, alumina and ceramic.

12. The process as claimed in claim 1, wherein the separate, distinct particles of filler material comprise a free volume of 50% vol and 97% vol, based on a total volume of the filler material.

13. The process as claimed in claim 1, wherein the separate, distinct particles of filler material are present in an amount from 5 to 15% vol, based on a total volume of particles in the mixture.

14. The process as claimed in claim 1, wherein the filler material is a shape comprising at least one of saddle shaped, ring shaped, ball shaped, torus shaped, prism shaped and irregular shaped.

15. The process as claimed in claim 2, wherein the gas is conditioned in at least one of a coalescer, a droplet separator and a heat exchanger before it is put in contact with the mixture.

* * * * *